(12) United States Patent
Iida

(10) Patent No.: US 6,550,901 B2
(45) Date of Patent: *Apr. 22, 2003

(54) INK CARTRIDGE FOR INK JET PRINTER

(75) Inventor: Yuji Iida, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/749,325

(22) Filed: Dec. 27, 2000

(65) Prior Publication Data

US 2001/0006396 A1 Jul. 5, 2001

Related U.S. Application Data

(63) Continuation of application No. 09/460,363, filed on Dec. 13, 1999, now Pat. No. 6,193,364, which is a continuation of application No. 08/548,574, filed on Oct. 26, 1995, now Pat. No. 6,000,788.

(30) Foreign Application Priority Data

Oct. 26, 1994 (JP) .............................................. 6-287292
Sep. 11, 1995 (JP) .............................................. 7-258101

(51) Int. Cl.[7] .................................................. B41J 2/175
(52) U.S. Cl. ........................................................ 347/86
(58) Field of Search .................................... 347/84–87

(56) References Cited

U.S. PATENT DOCUMENTS

| | | | |
|---|---|---|---|
| 2,646,063 A | 7/1953 | Hayes | |
| 3,073,339 A | 1/1963 | Stelzer | |
| 3,176,712 A | * 4/1965 | Ramsden | 137/496 |
| 3,270,771 A | 9/1966 | Morgan et al. | |
| 3,896,853 A | 7/1975 | Bernhard | |
| 3,941,149 A | 3/1976 | Mittleman | |
| 4,152,710 A | 5/1979 | Matsuba et al. | |
| 4,514,742 A | 4/1985 | Suga et al. | |
| 4,520,369 A | 5/1985 | Shackleton | |
| 4,677,447 A | * 6/1987 | Nielsen | 347/87 |
| 4,744,109 A | 5/1988 | Yuill | |
| 5,039,997 A | 8/1991 | Pullen et al. | |
| 5,040,002 A | 8/1991 | Pollacek et al. | |
| 5,305,795 A | 4/1994 | Forberg | |
| 5,343,226 A | 8/1994 | Niedermeyer et al. | |
| 5,388,615 A | 2/1995 | Edlund et al. | |
| 5,453,772 A | 9/1995 | Aono et al. | |
| 5,500,663 A | * 3/1996 | Ujita et al. | 347/86 |
| 5,555,238 A | 9/1996 | Miyazawa | |
| 5,646,664 A | 7/1997 | Pawlowski, Jr. | |
| 5,751,319 A | 5/1998 | Robertson et al. | |

FOREIGN PATENT DOCUMENTS

| | | |
|---|---|---|
| DE | 1 852 284 | 5/1962 |
| DE | 32 02 796 A1 | 8/1993 |
| EP | 0 112 701 | 7/1984 |
| EP | 0 336 307 A2 | 10/1989 |
| EP | 0 424 133 | 4/1991 |
| EP | 0 529 880 B1 | 3/1993 |
| EP | 0 581 531 A2 | 2/1994 |
| EP | 0 609 863 B1 | 8/1994 |
| FR | 1145605 | 5/1957 |
| FR | 1268227 | 6/1961 |
| FR | 2391405 A1 | 12/1978 |
| GB | 751289 | 6/1956 |
| JP | 58-36457 A | 3/1983 |
| JP | 2-72271 | 3/1990 |
| JP | 5-162324 A | 6/1993 |
| JP | 11-170558 A | 6/1999 |
| WO | WO 92/12371 | 7/1992 |

* cited by examiner

*Primary Examiner*—Judy Nguyen
(74) *Attorney, Agent, or Firm*—Stroock & Stroock & Lavan LLP

(57) ABSTRACT

An ink cartridge for an ink jet printer is provided with a container having at least a first wall. An ink supply port is formed through the first wall for supplying ink to the exterior of the container. An ink chamber and an ink supply chamber are formed by a membrane valve seat made of an elastic thin membrane and formed with a through hole therethrough. A valve body is positioned opposing the through hole formed in the membrane valve seat, the valve body and membrane valve seat adjacent said through hole formed therein being maintained selectively in contact by a pressure difference between said ink chamber and said ink supply chamber.

74 Claims, 8 Drawing Sheets

INK CARTRIDGE FOR INK JET PRINTER

CROSS-REFERENCE TO RELATED APPLICATIONS

This is a continuation of application Ser. No. 09/460,363, filed Dec. 13, 1999, U.S. Pat. No. 6,193,364 which is a continuation of application Ser. No. 08/548,574, filed Oct. 26, 1995, now U.S. Pat. No. 6,000,788.

BACKGROUND OF THE INVENTION

The present invention relates generally to an ink cartridge and more particularly to an ink cartridge which is suitable for being mounted on a carriage for carrying an ink jet type recording head.

An ink jet recording apparatus such as an ink jet printer comprises an ink jet type recording head carried on a carriage in which pressure is applied to a pressure generating chamber. This chamber is maintained in fluid communication with a common ink tank on one side of the chamber and a nozzle opening on an other. Ink droplets are discharged from the nozzle opening upon the generation of pressure in the chamber. An ink cartridge comprising either the common ink tank or the common ink tank and a plurality of chambers and nozzle openings may be carried on the carriage for supplying the recording head with ink. This ink cartridge is constructed so that ink droplets are discharged onto a recording medium in response to printing data as the carriage is reciprocally moved.

Since the nozzle opening of the recording head is located at a position lower than the ink level in the ink cartridge, fluid pressure of the ink acts on the nozzle opening. A porous material is generally contained in the ink cartridge so that surface tension caused by the porous material allows the pressure inside the ink cartridge to be slightly lower than that at the nozzle opening in order to prevent ink from oozing out from the nozzle opening.

However, as ink is gradually consumed during printing operations and a smaller amount of ink remains absorbed in the porous material, the surface tension caused by the porous material becomes larger and makes it difficult to supply ink to the recording head. Thus, all ink contained in the cartridge will not be completely consumed.

Also, because of the porous material contained in the ink cartridge, the amount of ink stored in the ink cartridge is less than the volume of the ink cartridge by the actual total volume of the porous material. To compensate for the decreased amount of ink in a cartridge employing porous material, a larger ink cartridge is required than would be if the porous material were not employed in order to hold the same amount of ink.

To solve the problem mentioned above, an ink cartridge for an ink jet recording head, for example, as shown in U.S. Pat. No. 4,677,447 (based upon JP-A-62-23 1759), has been proposed. This patent shows an ink tank that is separated into two chambers by a wall formed with a through hole in a lower portion thereof. Ink is provided to the recording head from the first chamber. An umbrella check valve is movably arranged in the through hole. When the ink pressure on the ink head is decreased by expulsion of ink from the chamber, the umbrella check valve is opened to discharge the ink from the into to the cavity, and it is then supplied to the recording head from the first chamber into the second chamber, and it is then supplied to the recording head from the second chamber cavity.

According to the above-mentioned ink cartridge, a porous material need not be contained in the cartridge, so that a larger amount of ink can be substantially stored in the ink cartridge. However, use of the umbrella check valve raises another problem, since its offset amount is too large to finely adjust the amount of ink to be supplied to the recording head. Thus, fluctuations in the amount of ink supplied are caused and the printing quality is degraded.

In addition, since the ink in the first chamber is completely blocked from the recording head when the umbrella check valve is closed, if some change in environmental factors or temperature causes the volume of ink in the second chamber to increase as little as two to five percent, the pressure in the first chamber could increase and break the seal on a connection port which couples the ink cartridge to the recording head. The ink could then leak from the broken seal. Further, when the cartridge is mounted on the recording head, this increased pressure acts on the recording head whereby negative pressure cannot be maintained between the recording head and the ink tank, and thus ink could leak from the recording head.

Furthermore, the umbrella check valve is maintained in a closed state with a pressure difference of approximately 50 mmAq in order to ensure a stable supply of ink to the recording head. However, since this valve closing force is small, the umbrella check valve may open in response to a swinging motion of ink in the ink tank due to the movement of the carriage resulting in temporary pressure differences against the valve from the movement. Thus, stable printing may not be provided.

Additionally, if air enters a recording head while ink is being supplied thereto, the pressure for discharging ink droplets may be absorbed by the air bubble occurring within an ink passage of the recording head. Thus, defective printing may arise when the ink cartridge is exhausted. This problem may also arise if an ink cartridge is removed from a recording head if the ink is not depleted.

Accordingly, it is desirable to provide an ink cartridge which is capable of reliably supplying a recording head with ink in response to a minute pressure difference between the recording head and the ink cartridge, while maintaining negative pressure suitable for printing between the recording head and the ink cartridge, without being influenced by any swinging motion of ink contained therein due to the movement of a carriage upon which the recording head is mounted, and is also capable of preventing ink from leaking from an ink supply port of the cartridge leading to the recording head, or leaking from the recording head, due to temperature or other atmospheric changes.

Additionally, it is desirable to provide an ink cartridge which can prevent air from being drawn into the recording head at the time ink in the ink cartridge is exhausted, or if the ink cartridge is removed before all of the ink is depleted.

SUMMARY OF THE INVENTION

Generally speaking, in accordance with the invention, an ink container having an ink supply port formed in one of its walls is separated into two portions by a membrane valve seat made of an elastic thin membrane and formed with a through hole in a central portion thereof. The membrane forms an ink chamber in the portion of the ink container not adjacent the ink supply port and an ink supply chamber in the portion of the ink container adjacent the ink supply port. A valve body is arranged at a position opposite the through hole such that the membrane valve seat is urged to abut the valve body by a pressure difference between the ink chamber and the ink supply chamber, thereby selectively sealing the through hole.

The membrane valve seat receives a pressure difference over a wide area thereof to open a passage from the ink chamber to the ink supply chamber in response to the consumption of a small amount of ink from the ink supply chamber. Thus, the ink can be discharged to a recording head without resulting in excessive negative pressure being imparted on the recording head. Also, if the pressure inside the ink supply chamber increases due to a temperature rise, other environmental factors or the like, the membrane valve seat is responsive to this increased pressure in the ink supply chamber and releases an increased portion of ink from the ink supply chamber to the ink chamber, thereby preventing ink from leaking from the recording head. Further, the membrane valve seat is maintained in close contact with the valve body through its own elasticity to reliably prevent the valve member from bouncing or vibrating due to the movement of the carriage. The ink container may be in the form of an ink cartridge removably mounted on the recording head.

Accordingly, it is an object of this invention to provide an improved ink cartridge capable of reliably supplying ink to a recording head.

Another object of the invention is to provide an improved ink cartridge capable of regulating the pressure imparted to the recording head.

A further object of the invention is to provide an improved ink cartridge capable of regulating the pressure imparted to the recording head and keeping ink from leaking even if temperature changes or other environmental changes cause a change in pressure in the cartridge.

Yet another object of the invention is to provide an improved ink cartridge which prevents air from being drawn into the recording head if the ink in the cartridge is exhausted, or if the ink cartridge is removed before all of the ink is exhausted.

Still other objects and advantages of the invention will in part be obvious and will in part be apparent from the specifications and drawings.

Additionally, the invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 13:
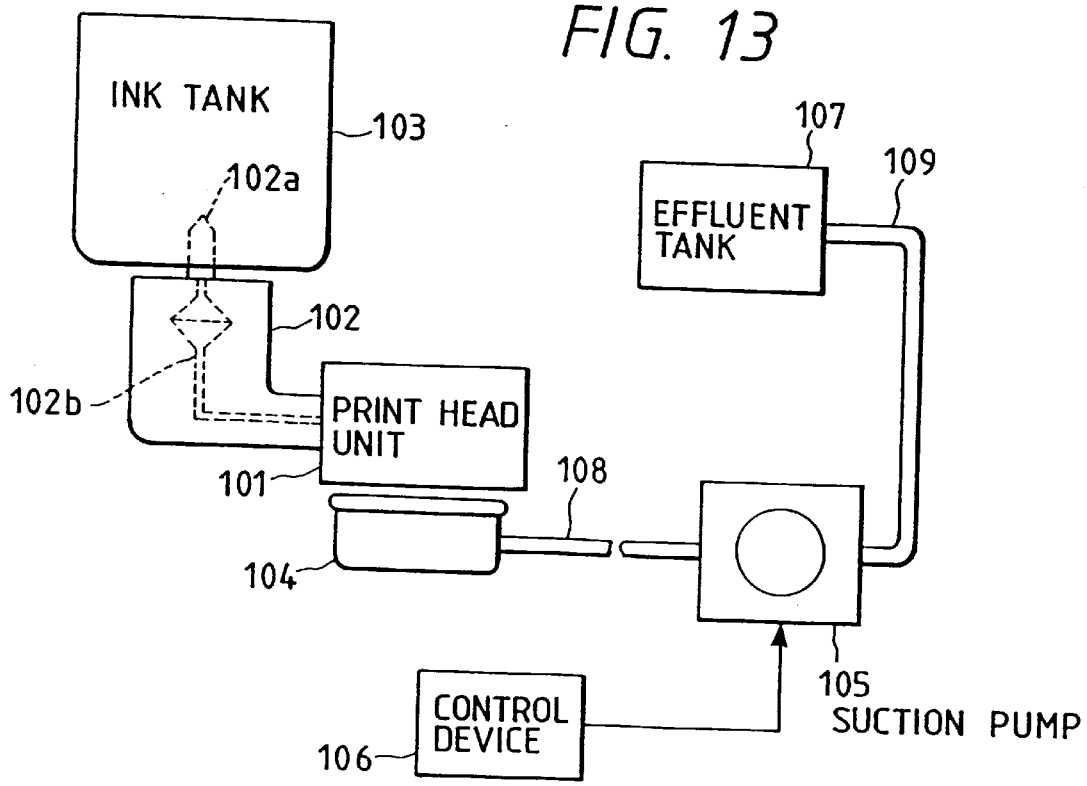
FIG. 13 is a schematic view showing an ink supply system of an ink jet type recording apparatus to which the embodiments of the invention can be applied.

FIG. 13 is a schematic view showing an ink supply system of an ink-jet type recording apparatus to which the present invention can be applied.

A print head unit 101 of an ink-jet type is connected to an ink tank 103 through a connecting member 102. Ink is supplied from ink tank 103 to print head unit 101 through a hollow needle 102a and an ink supply passage 102b of connecting member 102, so that print head unit 101 emits droplets of ink in accordance with print signals.

The apparatus shown in FIG. 13 also includes a cap member 104 disposed in a non-printing area. Cap member 104 is displaceable into an abutting position against the nozzle plate of print head unit 101 by a drive mechanism (not shown), for preventing the nozzle openings from drying. Cap member 104 is connected through a tube 108 to a suction pump 105 which is operated by a control device 106 to suction ink from print head unit 101 through cap member 104. The apparatus shown in FIG. 13 is also provided with an effluent tank 107 connected to an outlet port of suction pump 105 through a tube 109.

The recording head may be of any structure described in European Patent Publication Nos. 581,531; 609,863; 584,823.

Figure 1:
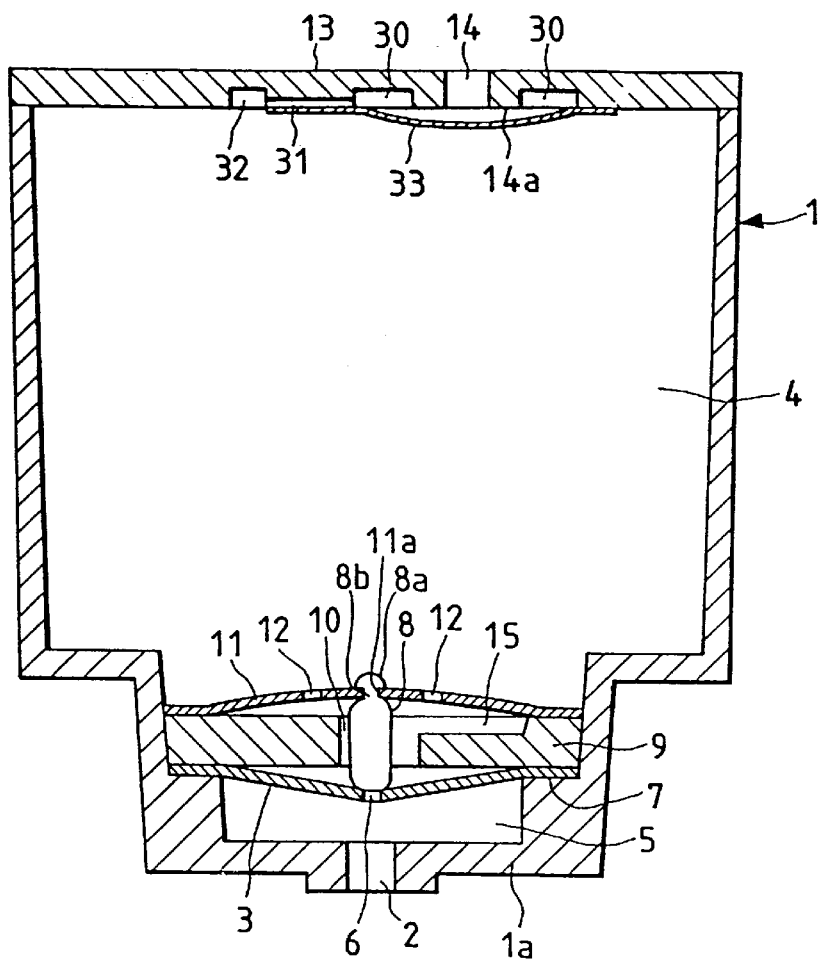
FIG. 1 is a cross-sectional view of an ink tank cartridge constructed in accordance with a first embodiment of the invention.

Referring to FIG. 1, a first embodiment of the invention is depicted wherein a container constituting an ink cartridge body, indicated generally at reference numeral 1 is formed with a first wall 1a with an ink supply port 2 formed therein, into which an ink supply needle of a recording head (not shown) may be inserted. The space inside container 1 is separated into an ink chamber 4 and an ink supply chamber 5 by a membrane valve seat 3, described hereinafter. Membrane valve seat 3 is made of an elastic membrane, such as a rubber membrane, polymeric elastomer membrane or the like, having a resistance to ink, and formed with a membrane through hole 6 in a central portion thereof. Membrane valve seat 3 is placed on a step 7 formed in a lower portion of container 1. Membrane valve seat 3 is maintained in a stretched state by a valve assembly 9 which engages and holds the periphery of membrane valve seat 3 against step 7.

A valve body 8 is vertically movably inserted into a valve through hole 10 formed through valve assembly 9. Valve body 8 has a width that ensures the formation of a gap between valve assembly 9 and valve body 8 through which ink flows, and a length slightly larger than the thickness of valve assembly 9. In a normal state, when cartridge 1 is not connected to a recording head undergoing a printing operation, valve body 8 has its lower end placed in elastic contact with membrane valve seat 3 by a valve body support member 11 so as to close the membrane through hole 6 of membrane valve seat 3. The lower end of valve body 8 is formed with a curved periphery to form a better seal with membrane valve seat 3. Valve assembly 9 is formed with an ink passage 15 in the surface thereof facing away from ink supply port 2 and communicating to valve through hole 10 for directing ink thereto.

Valve body support member 11 is arranged on and secured at its periphery to the surface of valve assembly 9 on the opposed side of valve assembly 9 to membrane valve seat 3, in a stretched state in order to maintain valve body 8 in elastic contact with membrane valve seat 3, as well as to prevent valve body 8 from lowering below a predetermined position. Valve body support member 11 is made of a similar material to that of membrane valve seat 3, and is formed with a support member through hole 12 therein forming ink passage 15. Also, valve body support member 11 supports a top portion 8a of valve body 8 adjacent but spaced from support member through hole 12. In this embodiment, the upper end of valve body 8 is formed with annular peripheral groove 8b for receiving the periphery of a mounting aperture 11a in valve support member 11 and a head 8a shaped both to be forced through mounting aperture 11a by elastic deformation thereof due to its rounded top end, and to retain the valve body on the valve body support membrane when mounted thereon.

Preferably, membrane valve seat 3, valve body support member 11, and valve body 8 are assembled with and fixed to valve assembly 9 prior to the final construction of container 1, and are incorporated into container 1 by placing the entire assembly on step 7 of container 1 at one time.

Container 1 has its upper end closed by a lid member 13 having an atmosphere communicating hole 14 formed therethrough. On the side of lid member 13 facing the inside of ink chamber 4, lid member 13 is formed with a recess 30 surrounding atmosphere communicating hole 14, a communicating port 32 positioned a predetermined distance away from recess 30, and a narrow groove 31 constituting a capillary channel for maintaining recess 30 and communicating port 32 in fluid communication. A flexible membrane 33 is arranged over recess 30 and groove 31 in such a loose state that flexible membrane 33 is maintained a small distance away from communicating hole 14 when lid member 13 is placed on container 1, while one wall of the capillary channel of groove 31 is defined by flexible membrane 33.

In this embodiment, if container 1 is positioned (for example, tilted or turned upside down) to bring ink in ink chamber 4 into contact with lid member 13, flexible membrane 33 receives the pressure of the ink and is moved towards lid member 13. Flexible membrane 33 then comes into contact with a protrusion 14a defined by recess 30 around atmosphere communicating hole 14, so that atmosphere communicating hole 14 is closed to prevent the ink from leaking therethrough.

When ink supply port 2 is penetrated by an ink supply needle of the recording head (not shown) carried on a carriage (the ink supply port being normally sealed by an ink impermeable closure (not shown) pierceable by the needle in a conventional manner), ink supply chamber 5 is placed in fluid communication via this ink supply needle with the recording head. In this state, flexible membrane 33 of lid member 13 is maintained in a hanging position away from lid member 13 so as to open atmosphere communication hole 14 because of gravity or other pressure difference. Thus, ink chamber 4 communicates with the atmosphere through open atmosphere communicating hole 14, recess 30, groove 31, and communicating port 32.

Figure 2A:
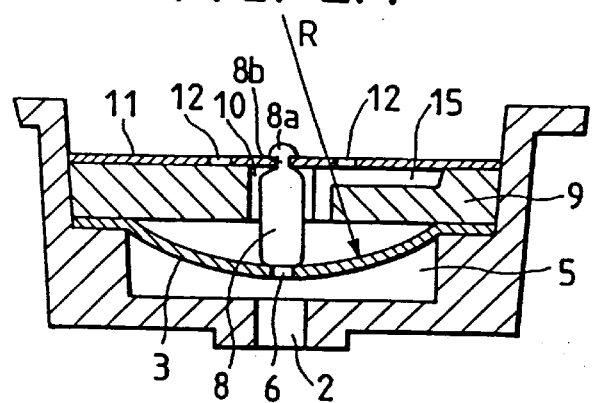
FIGS. 2A and 2B respectively are fragmentary cross-sectional views of the ink tank cartridge of FIG. 1 showing how the membrane valve seat and the valve body operate when the ink cartridge is mounted on a recording head.
Figure 2B:
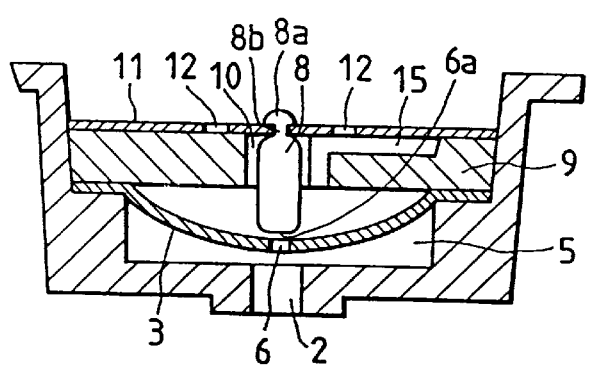
Figure 2C:
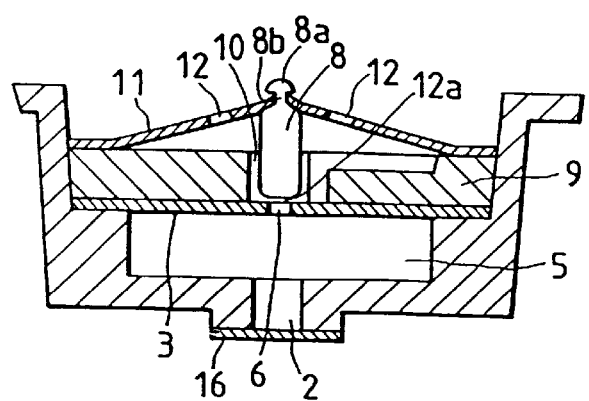
FIG. 2C is a cross-sectional view of the ink tank cartridge of FIG. 1 showing the valve body when the ink cartridge is supplied with ink.

As is shown in FIGS. 2A, 2B and 2C, in the cartridge constructed in this manner, when printing is started and the recording head discharges ink droplets onto a recording medium or the like, ink in ink supply chamber 5 flows through ink supply port 2 into the recording head, whereby the pressure inside ink supply chamber 5 gradually decreases. In response to the decreased pressure inside ink supply chamber 5, membrane valve seat 3 receives pressure from ink chamber 4 and expands in the direction toward ink supply port 2, by virtue of its elasticity, in the form of an essentially spherical surface having a radius R. At this time, since valve body 8 moves in conjunction with membrane valve seat 3 (FIG. 2A), ink contained in ink chamber 4 is prohibited from flowing into ink supply chamber 5 which in turn prevents the pressure inside ink supply chamber 5 from increasing excessively, while also preventing the pressure inside ink supply chamber 5 from decreasing excessively. In this manner, the pressure on the recording head is maintained at constant negative pressure with respect to the ink chamber 4.

As more ink is consumed by the recording head during a printing operation, membrane valve seat 3 is further elastically expanded toward ink supply port 2. Valve body 8 is prevented from lowering below a predetermined position by valve body support member 11, so that valve body 8 is separated from membrane valve seat 3 by a very narrow gap 6a (FIG. 2B). In this state, ink in ink chamber 4 passes through support through hole 12, passage 15, valve through hole 10 and narrow gap 6a formed between valve body 8 and membrane valve seat 3, and flows through membrane through hole 6 into ink supply chamber 5.

When the inflow of the ink causes the pressure inside ink supply chamber 5 to slightly increase, membrane valve seat 3 moves back toward valve body 8 by its elasticity and elastically contacts with valve body 8, whereby narrow gap 6a and membrane through hole 6 are closed by the lower surface of valve body 8. This prohibits ink from flowing from ink chamber 4 into ink supply chamber 5. As a result, the pressure at the ink supply port is maintained at a constant level irrespective of the amount of ink contained in ink chamber 4.

Each time the pressure inside ink supply chamber 5 slightly decreases because of ink consumption during a printing operation, membrane valve seat 3 slightly expands toward ink supply port 2 to form a gap between membrane valve seat 3 and valve body 8, through which ink from ink chamber 4 flows into ink supply chamber 5. In this manner, membrane valve seat 3, made of an elastic membrane, is brought into contact with and separated from valve body 8 in accordance with the consumption of ink during printing. Thus, by setting the elasticity of membrane valve seat 3 at an appropriate predetermined magnitude, it is possible to remarkably reduce the difference in pressure between the time an ink supply procedure will begin and end, as well as to discharge all ink in ink chamber 4 to the recording head so that none of the ink will be wasted.

If the ambient temperature rises while printing is not being performed, the pressure inside ink supply chamber 5 will increase. This increase in pressure may also be caused by changes in a number of other environmental factors. In response to this increased pressure, membrane valve seat 3 moves toward ink chamber 4 which is open to the atmosphere. This prevents the pressure inside ink supply chamber 5 from increasing, thus maintaining appropriate negative pressure between ink chamber 4 and recording head irrespective of temperature rise or pressure increase. It is therefore possible to prevent ink from leaking from the recording head due to an increase in pressure.

Figure 3:
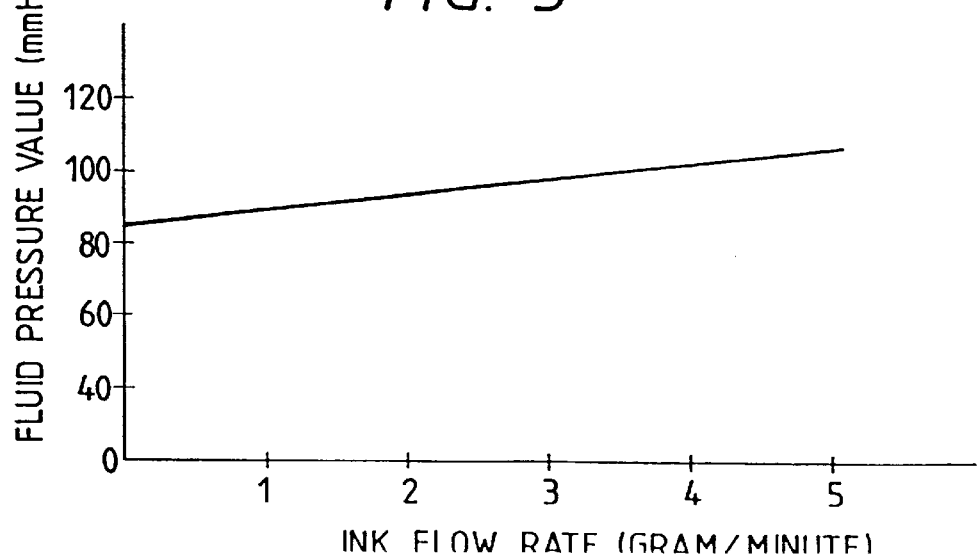
FIG. 3 is a graph representing the relationship between a discharging amount of ink and the fluid pressure value of the ink cartridge of FIG. 1.

In a preferred embodiment, membrane valve seat 3 is formed of a rubber membrane having a thickness of 0.04 mm and an effective diameter, i.e., an elastically deformable region of 20 mm. A lower limit position of valve body 8 is designed such that the radius R of the spherical surface is 26 mm immediately before ink flows out, i.e., in a critical state with valve body 8. Reference is now made to FIG. 3, which is a graph which depicts the change in fluid pressure value of the ink cartridge according to the invention. It can be understood from FIG. 3 that even if a large amount of ink, for example, five grams per minute of ink, is supplied, the increase in fluid pressure value is small. Thus, ink can be smoothly supplied to the recording head even if a large amount of ink is consumed by the recording head without imparting excessive negative pressure on the recording head.

During the manufacturing and ink filling process, a negative pressure is applied to ink chamber 4 to exhaust air from cartridge 1. With ink supply port 2 being closed by a filling seal 16, ink chamber 4 initially achieves a lower pressure than ink supply chamber 5. Thus, as shown in FIG. 2C, valve body 8 moves toward ink chamber 4 against the elastic force of valve body support member 11 to form a filling gap 12a between membrane valve seat 3 and valve body 8, so that all air can be exhausted from the entire cartridge 1 including ink chamber 4 and ink supply chamber 5, irrespective of the existence of membrane valve seat 3 and valve body 8. This permits the entire cartridge 1, including ink supply chamber 5, to be filled with ink.

Figure 4:
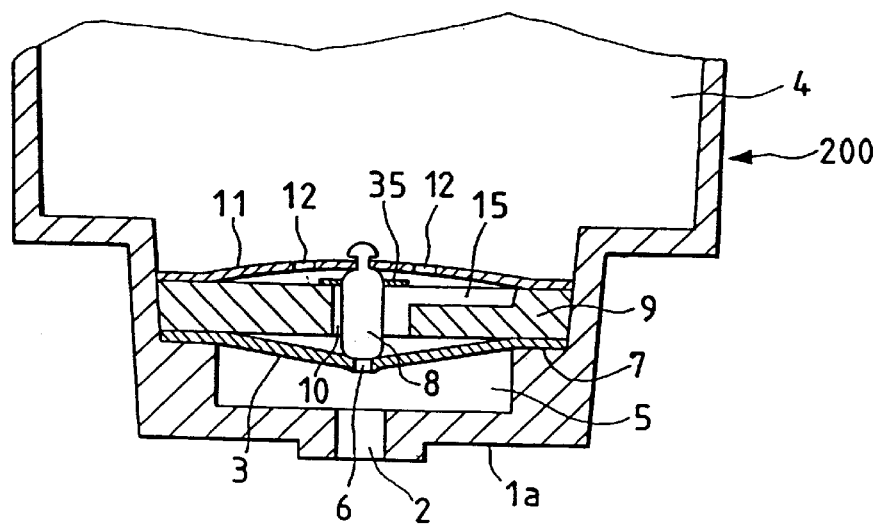
FIG. 4 is a fragmentary cross-sectional view of an ink tank cartridge constructed in accordance with a second embodiment of the invention showing the ink supply chamber and its surroundings.

Reference is now made to FIG. 4 which depicts an ink cartridge 200 constructed in accordance with a second embodiment of the invention, like elements being designated by like reference numerals. In this second embodiment, valve body 8 is provided with a flat positioning piece 35 fixed thereto on the side thereof facing valve body support member 11, in the region of valve through hole 10, which abuts the upper peripheral surface of valve body 8 when the lower surface of valve body 8 is brought into contact with membrane valve seat 3. When valve body 8 abuts membrane valve seat 3, positioning piece 35 is maintained in contact with the upper surface of valve assembly 9 and the periphery of valve body 8, and valve body 8 is supported by valve assembly 9 to maintain its posture as vertical as possible. Thus, membrane through hole 6 of membrane valve seat 3 can be reliably closed by valve body 8 even if cartridge 200 suffers from vibrations due to the movement of the carriage or the like.

Figure 5:
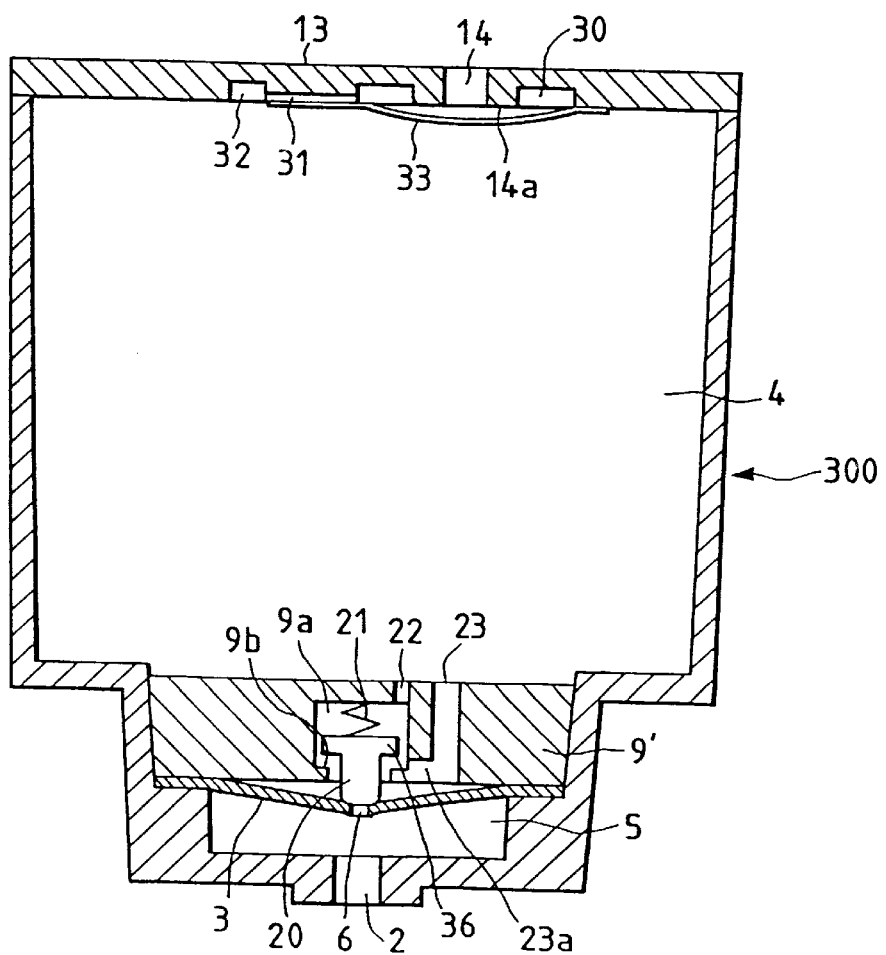
FIG. 5 is a cross-sectional view of an ink tank cartridge constructed in accordance with a third embodiment of the invention.

Reference is now made to FIG. 5 which depicts an ink cartridge 300 constructed in accordance with a third embodiment of the invention, like elements being designed by like reference numerals. In this embodiment a valve body 20 is inserted into a valve body accommodating chamber 9a formed in valve assembly 9' with spring 21 positioned to urge valve body 20 toward ink supply port 2. A lower limit position of valve body 20 is defined by a laterally outwardly extending positioning piece 36 formed on the upper end of valve body 20 abutting a laterally inwardly extending protrusion 9b formed in a lower portion of valve body accommodating chamber 9a. Also, as is shown in FIG. 5, ink chamber 4 is selectively maintained in fluid communication with ink supply chamber 5 via through holes 22 and 23, through hole 22 communicating directly between ink chamber 4 and valve body accommodating chamber 9a, which through hole 22 communicates directly between ink chamber 4 and the space between membrane valve seat 3 and has a laterally extending surface groove 23a formed on the side of valve assembly 9' facing said membrane valve seat 3 extending between through hole 23 and valve body accommodating chamber 9a.

Figure 6A:
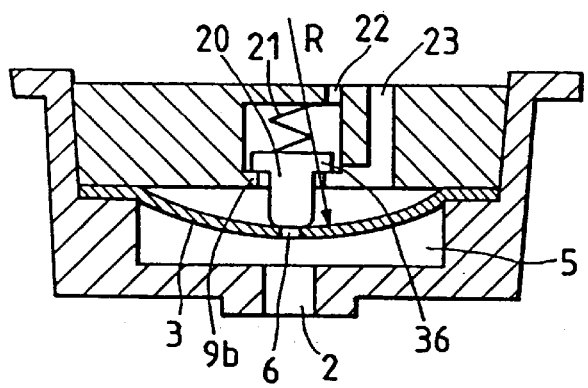
FIGS. 6A and 6B respectively are fragmentary cross-sectional views of the ink tank cartridge of FIG. 5 showing how the membrane valve seat and the valve body operate when the ink cartridge is mounted on a recording head.
Figure 6B:
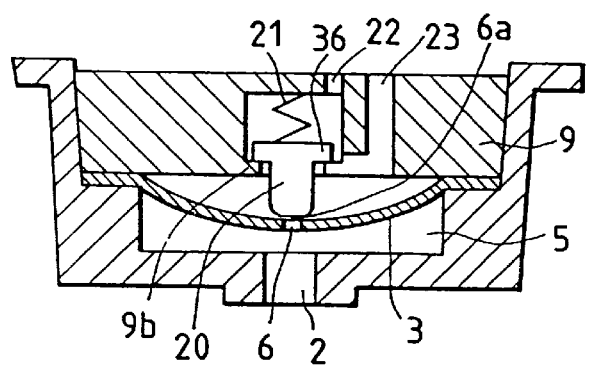
Figure 6C:
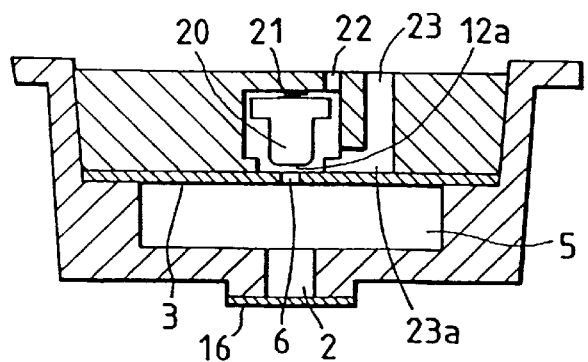
FIG. 6C is also a cross-sectional view of the ink tank cartridge of FIG. 5 showing the valve body when the ink cartridge is supplied with ink.

In this third embodiment, as is shown in FIGS. 6A, 6B and 6C, membrane valve seat 3, in response to decreased pressure inside ink supply chamber 5, receives pressure from ink chamber 4 and expands toward supply port 2, by virtue of its elasticity, in the form of an essentially spherical surface having a radius R. Thus, since valve body 20 moves in conjunction with membrane valve seat 3 by the resilient force of spring 21, and positioning piece 36 abuts protrusion 9b to maintain valve body 20 in a vertical posture (FIG. 6A), ink is prohibited from flowing from ink chamber 4 into ink supply chamber 5 while preventing the pressure inside ink supply chamber 5 from decreasing excessively. In this manner, membrane valve seat 3 abuts valve body 20 irrespective of any vibrations or swinging motion of the cartridge due to the movement of the carriage, so that ink pressure on the recording head is maintained at constant negative pressure with respect to ink chamber 4.

As more ink is consumed by the recording head during a printing operation, membrane valve seat 3 is further expanded toward ink supply port 2. Valve body 20 is prevented from lowering below a predetermined position by protrusion 9b of valve accommodating chamber 9a, so that valve body 8 is separated from membrane valve seat 3 by very narrow gap 6a (FIG. 6B). In this state, ink in ink chamber 4 passes through narrow gap 6a formed between valve body 20 and membrane valve seat 3 and flows through membrane through hole 6 into ink supply chamber 5.

When the inflow of the ink causes the pressure inside ink supply chamber 5 to slightly increase, membrane valve seat 3 moves back toward valve body 20 by its elasticity and elastically contacts with valve body 20, whereby narrow gap 6a and membrane through hole 6 are closed by the lower surface of valve body 20. This prohibits ink from flowing from ink chamber 4 into ink supply chamber 5. As a result, the pressure at ink supply port 2 is maintained at a constant level irrespective of the amount of ink contained in the ink chamber 4.

During the manufacturing and ink filling process, a negative pressure is applied to ink chamber 4 to exhaust air from cartridge 300. With ink supply port 2 being closed by filling seal 16, ink chamber 4 achieves a lower pressure than ink supply chamber 5. Thus, as shown in FIG. 6C, valve body 20 moves toward ink chamber 4 against the force of spring 21 to form a filling gap 12a between membrane valve seat 3 and valve body 20, so that all air can be exhausted from the entire cartridge 300, irrespective of the existence of membrane valve seat 3 and valve body 20. This permits the entire cartridge 300 including ink supply chamber 5 to be filled with ink.

Figure 7:
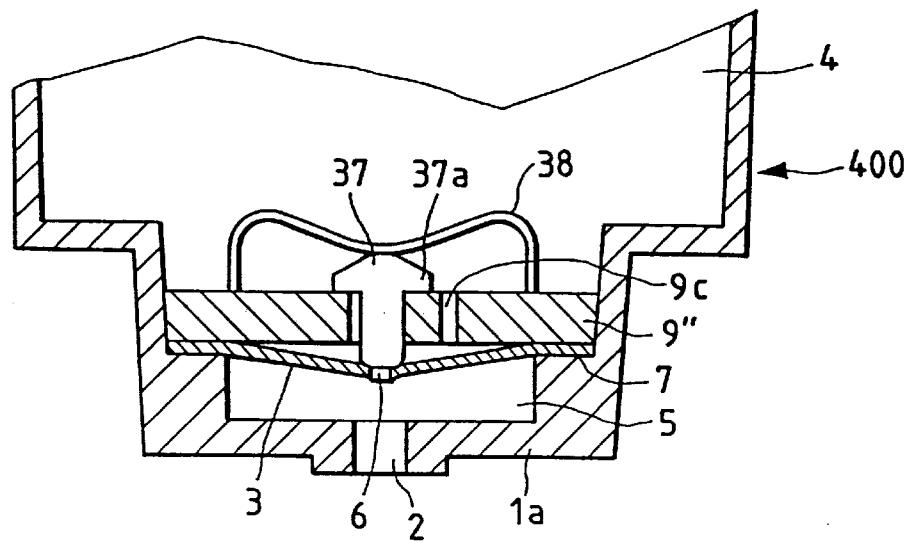
FIG. 7 is a fragmentary cross-sectional view of an ink tank cartridge constructed in accordance with a fourth embodiment of the invention showing the ink supply chamber and its surroundings.

In the foregoing third embodiment, an elastic member (spring 21) for bringing valve body 20 into contact with membrane valve seat 3 is incorporated in valve assembly 9'. Alternatively, in a fourth embodiment, like elements being designated by like reference numerals, an ink cartridge body 400 may be formed with a valve body 37, as shown in FIG. 7, which may be formed in a mushroom shape, such that a cap portion 37a functions as a positioning piece and as a stopper, and a spring 38, mounted at its periphery to the top surface of valve assembly 9", may be used to urge the top of valve body 37 toward membrane valve seat 3. Since valve body 37 and spring 38 can be mounted from the outside of valve assembly 9", the assembling work of the ink tank cartridge can be simplified. A through hole 9c is formed in valve assembly 9" communicating between ink chamber 4 and the space between the lower surface of valve assembly 9" and membrane valve seat 3.

Figure 8:
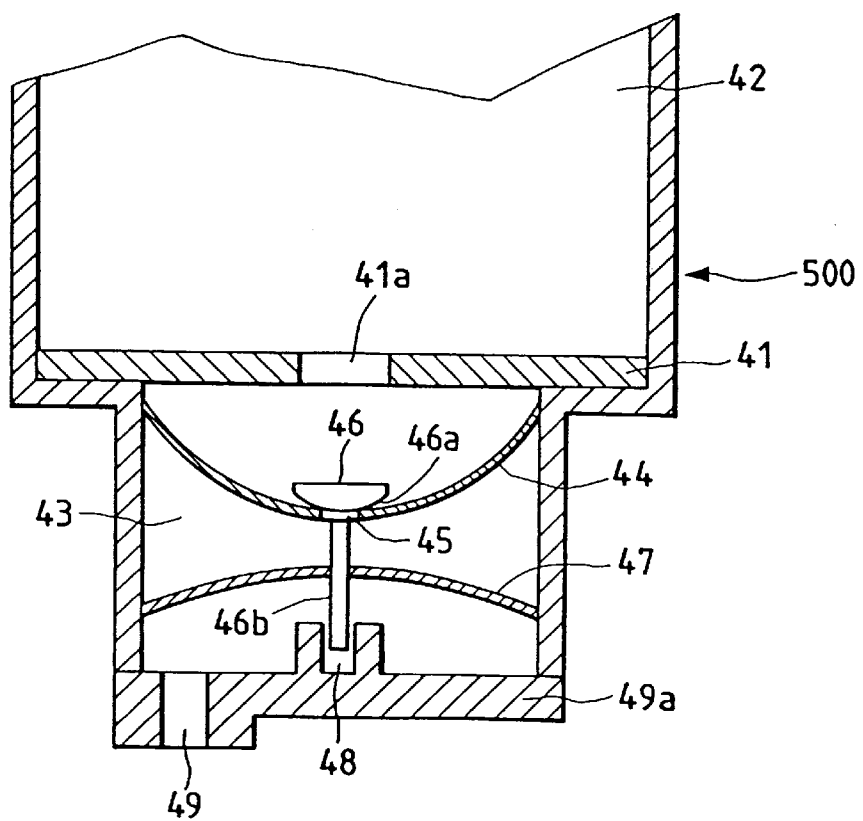
FIG. 8 is a fragmentary cross-sectional view of an ink tank cartridge constructed in accordance with a fifth embodiment of the invention showing the ink supply chamber and its surroundings.

Reference is now made to FIG. 8 which depicts an ink cartridge 500 constructed in accordance with a fifth embodiment of the invention, like elements being designated by like reference numerals. While in the foregoing embodiments, the spring is arranged above the valve body, it is apparent that similar effects can be produced when a container 500 is separated into an ink chamber 42 and an ink supply chamber 43 by a partition 41 formed with a partition through hole 41a. Ink supply chamber 43 houses a membrane valve seat 44 and a valve body 46 comprising an elongated portion 46b extending through a membrane through hole 45 and head portion having a spherically formed lower surface 46a for sealing membrane through hole 45 formed through membrane valve seat 44. Elongated portion 46b extends from and perpendicular to lower surface 46a and penetrating membrane through hole 45 of membrane valve seat 44. Elongated portion 46b extends through and is supported on a spring 47 which always urges elongated portion 46b, and therefore valve body 46, in the direction of an ink supply port 49 and a guide hole 48, which receives the lower end of support member 46b to position valve body 46 in a vertical posture formed in a wall of the cartridge as shown in FIG. 8. Guide hole 48 is defined by an upwardly projecting annular wall 43a formed in a bottom wall 49a of ink cartridge 500.

According to this fifth embodiment, since valve body 46 is always urged toward wall 49a, in which ink supply port 49 is formed, by spring 47 to maintain a stable posture, irrespective of any force generated by ink, ink can be stably supplied to the recording head irrespective of any vibrations or swinging motion of ink in cartridge 500 due to the movement of the carriage. In this embodiment, similar to those described above, when the pressure below membrane valve seat 44 is decreased due to ink being consumed during printing, membrane valve seat 44 moves toward ink supply port 49, thereby maintaining the pressure below valve seat 44. When elongated portion 46b engages the bottom of guide hole 48, the movement of valve body 46 is stopped. Thereafter, any additional consumption of ink moves membrane valve seat 44 away from lower surface 46a of support member 46, thereby exposing a membrane through hole 45, and allowing ink to pass therethrough.

Figure 9:
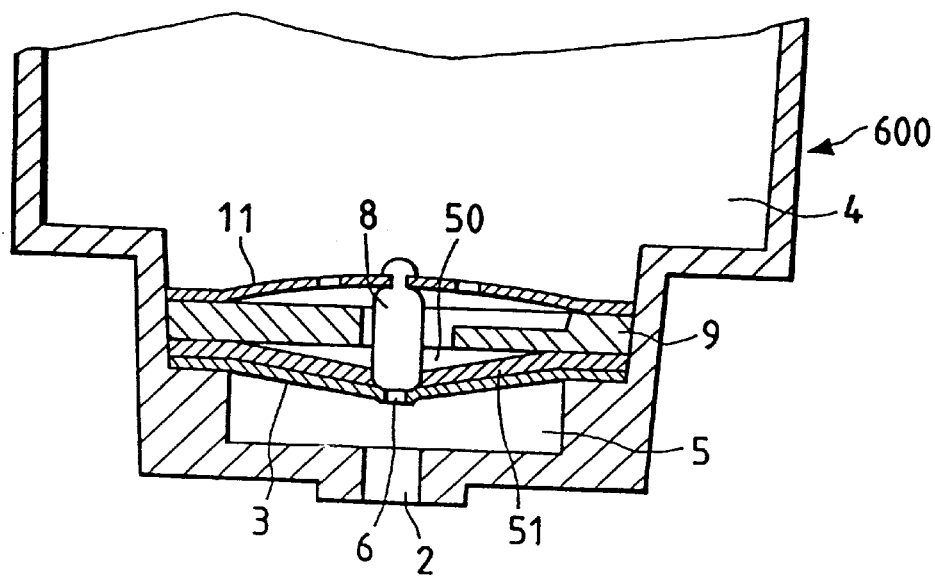
FIG. 9 is a fragmentary cross-sectional view of an ink tank cartridge constructed in accordance with a sixth embodiment of the invention showing the ink supply chamber and its surroundings.

Reference is now made to FIG. 9 which depicts ink cartridge 600 constructed in accordance with a sixth embodiment of the invention, like elements being designated by like reference numerals. A level stabilizing membrane 50 is made of a soft porous membrane or lattice membrane which can move in conjunction with membrane valve seat 3 is provided. A porous member through hole 51 is formed through a region opposite valve body 8 of stabilizing membrane 50, and a lower end portion of valve body 8 is fit into porous member through hole 51. Stabilizing membrane 50 has its periphery secured to valve assembly 9 and a central portion thereof secured to valve body 8.

When the pressure inside ink supply chamber 5 decreases as more ink is consumed during a printing operation, membrane valve seat 3 separates from valve body 8 so that ink in ink chamber 4 flows through porous member through hole 51 of level stabilizing membrane 50 into ink supply chamber 5.

After an additional amount of ink has been consumed during printing operations and the level of ink in ink chamber 4 has been reduced to a level lower than the position of valve assembly 9, the ink in ink chamber 4 may violently swing near valve body 8 due to the movement of the carriage. However, since the ink passes through membrane through hole 6 of membrane valve seat 3 after fluctuations in pressure of the ink have been suppressed by level stabilizing membrane 50 as much as possible, the ink pressure on the recording head is maintained at a constant level irrespective of the amount of ink remaining in ink chamber 4.

While in a number of the foregoing embodiments, an elastic member (valve body support member 11) is used to elastically maintain contact between the valve body 8 and membrane valve seat 3, the elastic member for elastically contacting valve body 8 with membrane valve seat 3 may be unnecessary if the elastic force of membrane valve seat 3 is actively utilized.

Figure 10:
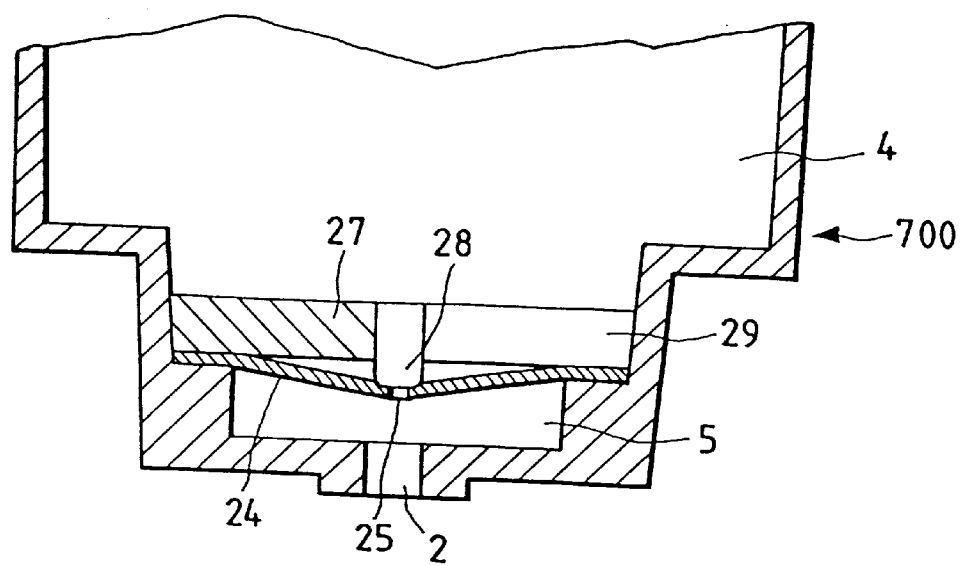
FIG. 10 is a fragmentary cross-sectional view of an ink tank cartridge constructed in accordance with a seventh embodiment of the invention showing the ink supply chamber and its surroundings.

Reference is now made to FIG. 10 which depicts an ink cartridge 700 constructed in accordance with a seventh embodiment of the invention, like elements being designed by like reference numerals. This seventh embodiment does not require an elastic member for elastically urging a valve body to maintain contact with a membrane valve seat. As shown in FIG. 10, a membrane valve seat 24 is formed with a membrane through hole 25 formed therein in a region opposing a valve body 28, hereinafter described, and has its periphery secured by a valve assembly 27. Valve body 28 is unmovably fixed to valve assembly 27 in a position perpendicular thereto. Ink chamber 4 is selectively maintained in fluid communication with ink supply chamber 5 via a communicating hole 29 in the form of a radial slit extending from valve body 28. When a pressure difference between ink chamber 4 and ink supply chamber 5 is equal to or less than a predetermined value, membrane valve seat 24, through its own elasticity, brings membrane through hole 25 into contact with valve body 28 to stop the outflow of ink from ink chamber 4 to ink supply chamber 5.

On the other hand, if the pressure inside ink supply chamber 5 decreases, membrane valve seat 24 extends toward ink supply port 2 in the form of a spherical surface, whereby membrane through hole 25 is removed from contact with valve body 28, and accordingly ink flows from ink chamber 4 into ink supply chamber 5 via membrane through hole 25. After a sufficient amount of ink has been supplied to ink supply chamber 5 to raise the pressure inside ink supply chamber 5, membrane valve seat 24 elastically contacts with valve body 28, against the pressure difference between ink chamber 4 and ink supply chamber 5, to stop the outflow of ink from ink chamber 4 to ink supply chamber 5.

Figure 11:
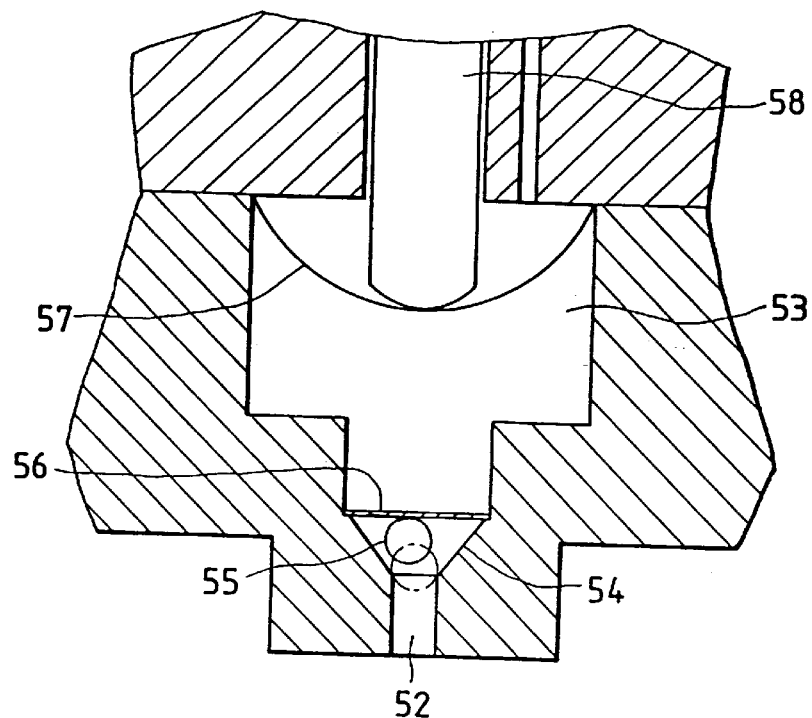
FIG. 11 is a cross-sectional view showing an ink supply port of an ink cartridge constructed in accordance with an eighth embodiment of the invention.

Reference is now made to FIG. 11 which depicts an ink cartridge constructed in accordance with an eighth embodiment of the invention, like elements being designated by like reference numerals. The ink cartridge of this eighth embodiment prevents air from entering a recording head at the time the recording head has depleted all of the ink in the ink cartridge. In a connecting region between an ink supply port 52 and an ink supply chamber 53, a downwardly tapered conical valve seat 54 is formed. A spherical floating valve 55, which floats by a floating force produced by the buoyancy of spherical floating valve 55, is accommodated in conical valve seat 54. Further, the upper end of the conical valve seat 54 is covered with a valve retention plate 56, made of an ink transmissible material such as a screen, to complete a shielding valve. In FIG. 11, a membrane valve seat 57 is also arranged in selectable contact with a valve body 58 for controlling the flow of ink thereto from an ink chamber (not shown).

When the ink cartridge is mounted on the recording head, floating valve 55 floats upward and is retained against valve retention plate 56 by a floating force to open ink supply port 52 through which ink is supplied to the recording head. As ink in the cartridge is consumed during printing operations, the level of ink in the cartridge is reduced in the vicinity of ink supply port 52. Floating valve 55 looses its floating force because of the absence of ink, and therefore comes into contact with valve seat 54 to close ink supply port 52 (as indicated by the broken line in FIG. 11). Even if printing is continued with the almost exhausted cartridge, the closed ink supply port 52 prohibits air from entering the recording head, thus preventing defective printing.

Generally, an ink cartridge, once mounted on a recording head, is not removed until ink contained in the ink chamber is depleted. However, the ink cartridge may be removed from the recording head by an erroneous manipulation. If a once mounted cartridge is removed from the recording head, ink supply port 52 is open to the atmosphere and may allow air to enter the ink supply chamber and the ink chamber, which may adversely affect the flow of ink during the recording operation.

Figure 12A:
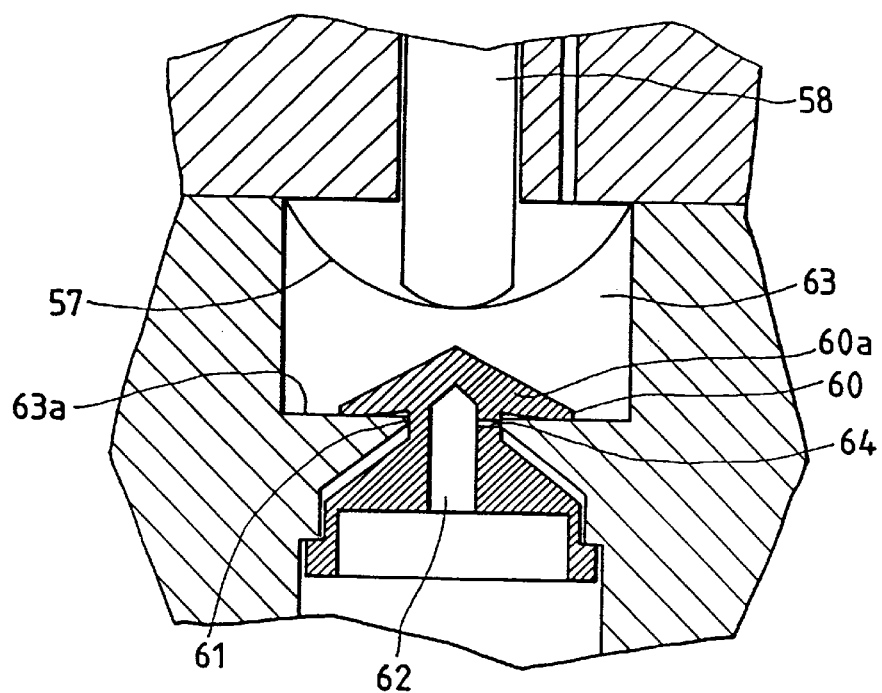
FIGS. 12A and 12B are cross-sectional views showing an ink supply port of an ink cartridge constructed in accordance with a ninth embodiment of the invention, FIG. 12A showing the ink supply port not mounted on a recording head and FIG. 12B showing the ink supply port mounted on a recording head.
Figure 12B:
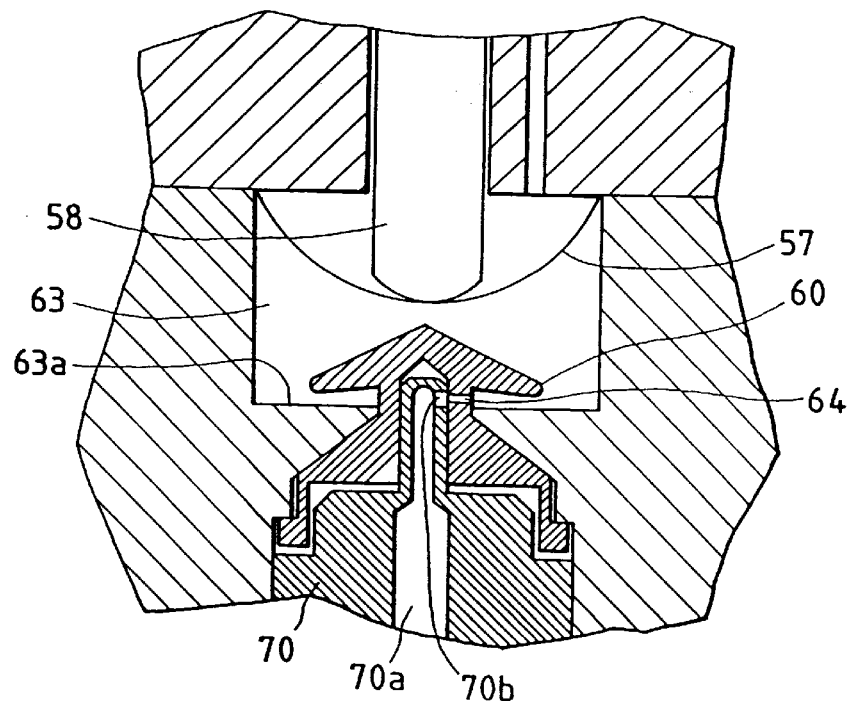

Reference is now made to FIGS. 12A and 12B which depict an ink tank cartridge constructed in accordance with a ninth embodiment of the present invention, like elements being designated by like reference numerals. As shown in FIGS. 12A and 12B, the ink cartridge of this ninth embodiment prevents air from entering the cartridge if the ink cartridge is removed before it is depleted. A telescopical valve body 60 is arranged in an ink supply port 61, and is formed with an ink supply needle fitting hole 62 in its lower portion into which an ink supply needle 70 may be removably fitted. Valve body 60 is also formed with a communicating hole 64 for connecting an ink supply chamber 63 with ink supply needle fitting hole 62 when valve body 60 moves to an upward limited position.

In this embodiment, before insertion of ink supply needle 70, as shown in FIG. 12A, valve body 60 which is formed with a radially extending, elastic periphery 60a, is maintained in elastic contact with a bottom surface 63a of ink supply chamber 63 by its elasticity to reliably prevent the outflow of ink from ink supply chamber 63.

When ink supply needle 70 is inserted into fitting hole 62, valve body 60 is separated from bottom surface 63a of ink supply chamber 63 and extends to the upward limited position, while communicating hole 64 is exposed to ink supply chamber 63 (FIG. 12B). This causes ink supply chamber 63 to be placed in fluid communication with an ink passage 70a of ink supply needle 70 through communicating hole 64, and a needle communicating hole 70b, whereby ink in ink supply chamber 63 flows into ink supply needle 70 and is consequently supplied to the recording head.

When the ink cartridge mounted on the recording head is removed, valve body 60 moves toward the bottom of FIG. 12A to close ink supply port 61 and hence ink supply chamber 63. This prevents the outflow of ink from ink supply chamber 63 as well as the entrance of air into ink supply chamber 63.

According to the present invention as described above, a container formed with an ink supply port in one of its walls is separated by a membrane valve seat made of an elastic thin membrane and formed with a through hole in the central portion thereof. An ink chamber is formed in the portion of the cartridge not adjacent the ink supply port, and an ink supply chamber is formed in the portion of the cartridge adjacent the ink supply port, and a valve body is positioned in opposition to the through hole. The membrane valve seat receives a pressure difference over a large area thereof because of the consumption of ink and allows ink to flow from the ink chamber in response to a small amount of consumed ink. Thus, the recording head can be supplied with ink without imparting excessive negative pressure on the recording head, and ink in the ink chamber can be discharged to the recording head without waste. Moreover, if the ambient temperature rises greatly or other environmental factors cause the pressure to increase while printing is not being performed, the membrane valve body displaces toward the ink chamber to release the pressure increased by the pressure rise inside the ink supply chamber communicating with the recording head to the ink chamber. It is therefore possible to prevent ink from leaking when the printer is not in use. Also, when the ink cartridge is mounted on the recording head, negative pressure suitable for printing is maintained between the recording head and the ink cartridge to ensure stable printing.

Further, since the elasticity of the membrane valve seat ensures an airtight seal between the membrane valve seat and the valve body, the valve function can be reliably performed irrespective of any swinging motion or vibrations of ink in the ink chamber caused by the movement of the carriage, thus making it possible to maintain a pressure difference between the ink cartridge and the recording head irrespective of the movement of the carriage to achieve an improvement in printing quality. Preferably, the ink cartridge body (container), valve assembly and valve body are formed of plastic.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to

What is claimed:
1. An ink-jet recording device for use with an ink container having an ink chamber having an amount of an ink therein, an ink supply chamber, and an ink supply port leading to the ink supply chamber and through which ink flows from the ink supply chamber to the ink-jet recording device, comprising:

- a connecting member upon which the ink container is detachably mounted;
- an ink-jet recording head joined to said connecting member; and
- an ink supply mechanism mounted to said connecting member for supplying ink from the ink supply port of the ink container to said recording head, the ink supply mechanism comprising:
  - a value body; and
  - a differential pressure valve including a movable elastic membrane member having an opening and normally in elastic contact with the valve body so that the opening is blocked by the valve body, the differential pressure valve separating the ink chamber from the ink supply chamber and opening at a pressure that is greater than a pressure exerted on the differential pressure valve just by the ink in the ink chamber.

2. An ink-jet recording device according to claim 1, wherein said ink supply mechanism is disposed in the ink container.

3. An ink-jet recording device according to claim 1, wherein said elastic membrane member is plate-like in shape.

4. An ink supply unit for use with an ink container having an ink chamber having an amount of an ink therein, an ink supply chamber, and an ink supply port in fluid communication with the ink supply chamber and adapted for connection to an ink-jet recording head, comprising:

- a valve body; and
- a differential pressure valve including a movable elastic membrane member having an ink flow port and normally in elastic contact with the valve body so that the ink flow port is blocked by the valve body, the differential pressure valve being disposed in the ink container, the differential pressure valve separating the ink chamber from the ink supply chamber and opening at a pressure that is greater than a pressure exerted on the differential pressure valve just by the ink in the ink chamber.

5. An ink supply unit according to claim 4, wherein said elastic membrane member lies in a plane perpendicular to an axis of the ink supply port.

6. An ink supply unit according to claim 4, wherein said elastic membrane member is formed at a center of the differential pressure valve with said ink flow port, the valve body is located on an upstream side of said ink flow port facing said ink flow port, and said ink flow port of said elastic membrane member is pressed against said valve body.

7. An ink supply unit according to claim 4, wherein said ink chamber communicates with ambient air via a capillary formed in said container.

8. An ink supply unit according to claim 7, wherein said capillary includes a groove formed on an upper wall of said ink chamber, and a flexible membrane along said groove.

9. An ink supply unit according to claim 4, wherein said elastic membrane member includes a movable part and a fixed part provided to a periphery of said movable part.

10. An ink supply unit according to claim 9, wherein a central area of said movable part is offset from a peripheral area thereof.

11. An ink supply unit according to claim 4, wherein said elastic membrane member includes a movable part and a supporting part being formed in an outer periphery of said movable part.

12. An ink supply unit according to claim 4, wherein said valve body is protruded toward said elastic membrane member.

13. An ink supply unit according to claim 4, wherein said valve body is formed as a protruded part having a planar surface on a side toward said elastic membrane member.

14. An ink unit according to claim 4, wherein said elastic membrane member is formed at its center with the ink flow port, and the valve body is formed as a protruded part defining a planar surface facing the elastic membrane member.

15. An ink supply unit according to claim 4, wherein said ink chamber and an area in which said differential pressure valve is accommodated are separated by a wall having a communication hole.

16. An ink supply unit according to claim 4, wherein said elastic membrane member is plate-like in shape.

17. An ink tank unit for detachable mounting on a connecting member of an ink jet recording apparatus, comprising:

- a container having an ink chamber having an amount of an ink therein, an ink supply chamber, and an ink supply port leading to the ink supply chamber and through which ink flows from the ink supply chamber to a recording head; and
- a mechanism for selectively communicating said ink chamber with the recording head in response to a pressure change caused in said ink supply chamber due to ejection of ink from the recording head, said mechanism including:
  - a stationary valve part; and
  - a movable valve part having an elastically deformable membrane having a through hole;
- wherein said stationary valve part and said movable valve part are normally in contact with each other to close said through hole, and said movable valve part is selectively separated from said stationary valve part to open said through hole and communicate said ink chamber with the recording head through said through hole depending on said pressure change, the movable valve part separating from the stationary valve part at a pressure that is greater than a pressure exerted on the movable valve part just by the ink in the ink chamber.

18. An ink tank unit according to claim 17, wherein said container has a partition wall between said ink chamber and said ink supply chamber, extending in a first direction and having a communication hole therein, and said through hole of said movable valve part is offset from said communication hole in said first directions.

19. An ink tank unit for detachable mounting on a connecting member of an ink jet recording apparatus, comprising:

- a container having a partition wall that defines and separates a first ink accumulating chamber containing an ink and a second ink accumulating chamber, said partition wall extending in a first direction, and having a first communication hole;
- an elastically deformable first valve part opposite from said first ink accumulating chamber with respect to said partition wall, and defining a third ink accumulating chamber between said first valve part and said partition wall and within said second ink accumulating chamber, said first valve part having a second communication hole offset from said first communication hole in said first direction, the first valve part moving at a pressure that is greater than a pressure exerted on the first valve part just by the ink in the first ink accumulating chamber;

a stationary, rigid second valve part provided to said partition wall and aligned with and blocking said second communication hole, so that when the first valve part moves said second communication hole is not blocked; and an ink supply port leading to the second ink accumulating chamber and through which ink flows from the second ink accumulating chamber to the ink-jet recording apparatus.

20. An ink tank unit according to claim 19, wherein said second valve part is protruded from said partition wall toward said first valve part.

21. An ink tank unit according to claim 20, wherein a distal end face of said second valve part contacts a part of said first valve part surrounding said second communication hole.

22. A selective ink supply system to be located between an ink chamber containing an ink and an ink supply port through which the ink flows to an ink-jet recording apparatus upon which the ink chamber is detachably mounted, said system comprising:

a valve assembly having a valve part and a first communication hole adjacent to said valve part; and an elastic member movable toward and away from said valve assembly, said elastic member having a second communication hole aligned with and blocked by said valve part and offset from said first communication hole, the elastic member separating from said valve part at a pressure that is greater than a pressure exerted on the elastic member just by the ink in the ink chamber so that when the elastic member moves said second communication hole is not blocked.

23. A selective ink supply system according to claim 22, wherein said first communication hole is in fluid communication with said ink chamber, and said second communication hole is in fluid communication with said ink supply port.

24. A selective ink supply system according to claim 22, wherein said valve part contacts said elastic member to define a space between said valve assembly and said elastic member.

25. A selective ink supply system according to claim 24, wherein ink flows from said ink chamber through said first communication hole and into said space and through said second communication hole to the ink supply port.

26. A selective ink supply system according to claim 22, wherein an outer periphery of said elastic member is held by said valve assembly.

27. A selective ink supply system according to claim 22, wherein said elastic member is plate-like in shape.

28. A selective ink supply system according to claim 22, wherein said valve part is a protrusion.

29. A selective ink supply system for selectively supplying ink from an ink chamber containing an ink to an ink supply port through which the ink flows to an ink-jet recording apparatus upon which said ink chamber is detachably mounted, said system comprising:

first means for fixedly positioning a valve part and a first communication hole adjacent to said valve part and communicated with said ink chamber; and second means for movably positioning a second communication hole against, and to be blocked by, said valve part and selectively communicating said first communication hole with said ink supply port through said second communication hole, said second means separating from the valve part at a pressure that is greater than a pressure exerted on said second means just by the ink in said ink chamber so that when the second means separates from the valve part said second communication hole is not blocked, wherein said second communication hole is aligned with said valve part and offset from said first communication hole.

30. A selective ink supply system according to claim 29, wherein said first means includes a valve assembly fixed with respect to an ink container, and said second means includes an elastic membrane member movably supported to said ink container.

31. A selective ink supply system according to claim 29, wherein said valve part is a protrusion.

32. A method of assembling an ink container for detachable mounting on an ink jet recording apparatus, comprising the steps of:

providing the ink container, the ink container having an ink chamber containing an ink, an ink supply chamber, an ink supply port in fluid communication with the ink supply chamber, a member separating the ink chamber from the ink supply chamber, the member having a valve body, and an elastic valve seat having an opening; and securing the valve seat and the member against each other and deforming the valve seat so that the opening presses against the valve body to prevent the valve seat from separating from the valve body under pressure exerted just by the ink in the ink chamber.

33. A method of assembling an ink-jet recording apparatus having a connecting member upon which an ink container is detachably mounted, comprising the steps of:

providing the ink container, the ink container having an ink chamber containing an ink, an ink supply chamber, an ink supply port in fluid communication with the ink supply chamber, a member separating the ink chamber from the ink supply chamber, the member having a valve body, and an elastic valve seat having an opening;

securing the valve seat and the member against each other and deforming the valve seat so that the opening presses against the valve body to prevent the valve seat from separating from the valve body under pressure exerted just by the ink in the ink chamber; and mounting the ink container on the connecting member.

34. An ink-jet recording device for use with an ink container having an ink chamber having an amount of an ink therein, an ink supply chamber, and an ink supply port leading to the ink supply chamber and through which ink flows from the ink supply chamber to the ink-jet recording device, comprising:

a connecting member upon which the ink container is detachably mounted;

an ink-jet recording head joined to said connecting member; and an ink supply mechanism mounted to said connecting member for supplying ink from the ink supply port of the ink container to said recording head, the ink supply mechanism comprising;

a valve body, and a differential pressure valve including a movable elastic membrane member having an opening and normally in elastic contact with the valve body so that the opening is blocked by the valve body, the differential pressure valve separating the ink chamber from the ink supply chamber and opening when ink downstream of the differential pressure valve establishes a pressure difference larger than a predetermined pressure difference relative to the ink in the ink chamber due to ink consumption by the ink-jet recording head.

35. An ink-jet recording device according to claim 34, wherein said ink supply mechanism is disposed in the ink container.

36. An ink-jet recording device according to claim 34, wherein said elastic membrane member is plate-like in shape.

37. An ink supply unit for use with an ink container having an ink chamber having an amount of an ink therein, an ink supply chamber, and an ink supply port in fluid communication with the ink supply chamber and adapted for connection to an ink-jet recording head, comprising:
   a valve body; and
   a differential pressure valve including a movable elastic membrane member having an ink flow port and normally in elastic contact with the valve body so that the ink flow port is blocked by the valve body, the differential pressure valve being disposed in the ink container, the differential pressure valve separating the ink chamber from the ink supply chamber and opening when ink downstream of the differential pressure valve establishes a pressure difference larger than a predetermined pressure difference relative to the ink in the ink chamber due to ink consumption by the ink-jet recording head.

38. An ink supply unit according to claim 37, wherein said elastic membrane member lies in a plane perpendicular to an axis of the ink supply port.

39. An ink supply unit according to claim 37, wherein said elastic membrane member is formed at a center of the differential pressure valve with said ink flow port, the valve body is located on an upstream side of said ink flow port facing said ink flow port, and said ink flow port of said elastic membrane member is pressed against said valve body.

40. An ink supply unit according to claim 37, wherein said ink chamber communicates with ambient air via a capillary formed in said container.

41. An ink supply unit according to claim 40, wherein said capillary includes a groove formed on an upper wall of said ink chamber, and a flexible membrane along said groove.

42. An ink supply unit according to claim 37, wherein said elastic membrane member includes a movable part and a fixed part provided to a periphery of said movable part.

43. An ink supply unit according to claim 42, wherein a central area of said movable part is offset from a peripheral area thereof.

44. An ink supply unit according to claim 37, wherein said elastic membrane member includes a movable part and a supporting part being formed in an outer periphery of said movable part.

45. An ink supply unit according to claim 37, wherein said valve body is protruded toward said elastic membrane member.

46. An ink supply unit according to claim 37, wherein said valve body is formed as a protruded part having a planar surface on a side toward said elastic membrane member.

47. An ink supply unit according to claim 37, wherein said elastic membrane member is formed at its center with the ink flow port, and the valve body is formed as a protruded part defining a planar surface facing the elastic membrane member.

48. An ink supply unit according to claim 37, wherein said ink chamber and an area in which said differential pressure valve is accommodated are separated by a wall having a communication hole.

49. An ink supply unit according to claim 37, wherein said elastic membrane member is plate-like in shape.

50. An ink tank unit for detachable mounting on a connecting member of an ink jet recording apparatus, comprising:
   a container having an ink chamber having an amount of an ink therein, an ink supply chamber, and an ink supply port leading to the ink supply chamber and through which ink flows from the ink supply chamber to a recording head; and
   a mechanism for selectively communicating said ink chamber with the recording head in response to a pressure change caused in said ink supply chamber due to ejection of ink from the recording head, said mechanism including:
      a stationary valve part; and
      a movable valve part having an elastically deformable membrane having a through hole;
   wherein said stationary valve part and said movable valve part are normally in contact with each other to close said through hole, and said movable valve part is selectively separated from said stationary valve part to open said through hole and communicate said ink chamber with the recording head through said through hole depending on said pressure change, the movable valve part separating from the stationary valve part when ink downstream of the movable valve part establishes a pressure difference larger than a predetermined pressure difference relative to the ink in the ink chamber due to ink consumption by the recording head.

51. An ink tank unit according to claim 50, wherein said container has a partition wall between said ink chamber and said ink supply chamber, extending in a first direction and having a communication hole therein, and said through hole of said movable valve part is offset from said communication hole in said first direction.

52. An ink tank unit for detachable mounting on a connecting member of an ink jet recording apparatus, comprising:
   a container having a partition wall that defines and separates a first ink accumulating chamber containing an ink and a second ink accumulating chamber, said partition wall extending in a first direction, and having a first communication hole;
   an elastically deformable first valve part opposite from said first ink accumulating chamber with respect to said partition wall, and defining a third ink accumulating chamber between said first valve part and said partition wall and within said second ink accumulating chamber, said first valve part having a second communication hole offset from said first communication hole in said first direction;
   a stationary, rigid second valve part provided to said partition wall and aligned with and blocking said second communication hole, so that when the first valve part moves said second communication hole is not blocked, the first valve part separating from the second valve part when ink downstream of the first valve part establishes a pressure difference larger than a predetermined pressure difference relative to the ink in the first ink accumulating chamber due to ink consumption by a recording head; and
   an ink supply port leading to the second ink accumulating chamber and through which ink flows from the second ink accumulating chamber to the ink-jet recording apparatus.

53. An ink tank unit according to claim 52, wherein said second valve part is protruded from said partition wall toward said first valve part.

54. An ink tank unit according to claim 53, wherein a distal end face of said second valve part contacts a part of said first valve part surrounding said second communication hole.

55. A selective ink supply system to be located between an ink chamber containing an ink and an ink supply port through which the ink flows to an ink-jet recording apparatus upon which the ink chamber is detachably mounted, said system comprising:
a valve assembly having a valve part and a first communication hole adjacent to said valve part; and
an elastic member movable toward and away from said valve assembly, said elastic member having a second communication hole aligned with and blocked by said valve part and offset from said first communication hole,
the elastic member separating from said valve part when ink downstream of the elastic member establishes a pressure difference larger than a predetermined pressure difference relative to the ink in the ink chamber due to ink consumption by an ink-jet recording head.

56. A selective ink supply system according to claim 55, wherein said first communication hole is in fluid communication with said ink chamber, and said second communication hole is in fluid communication with said ink supply port.

57. A selective ink supply system according to claim 55, wherein said valve part is a protrusion.

58. A selective ink supply system according to claim 55, wherein said valve part contacts said elastic member to define a space between said valve assembly and said elastic member.

59. A selective ink supply system according to claim 58, wherein ink flows from said ink chamber through said first communication hole and into said space and through said second communication hole to the ink supply port.

60. A selective ink supply system according to claim 55, wherein an outer periphery of said elastic member is held by said valve assembly.

61. A selective ink supply system according to claim 55, wherein said elastic member is plate-like in shape.

62. A selective ink supply system for selectively supplying ink from an ink chamber containing an ink to an ink supply port through which the ink flows to an ink-jet recording apparatus upon which said ink chamber is detachably mounted, said system comprising:
first means for fixedly positioning a valve part and a first communication hole adjacent to said valve part and communicated with said ink chamber; and
second means for movably positioning a second communication hole against, and to be blocked by, said valve part and selectively communicating said first communication hole with said ink supply port through said second communication hole, said second means separating from the valve part when ink downstream of said second means establishes a pressure difference larger than a predetermined pressure difference relative to the ink in the ink chamber due to ink consumption by an ink-jet recording head,
wherein said second communication hole is aligned with said valve part and offset from said first communication hole.

63. A selective ink supply system according to claim 62, wherein said first means includes a valve assembly fixed with respect to an ink container, and said second means includes an elastic membrane member movably supported to said ink container.

64. A selective ink supply system according to claim 62, wherein said valve part is a protrusion.

65. An ink tank unit for detachable mounting on a connecting member of an ink jet recording apparatus, comprising:
a container having an ink chamber having an amount of an ink therein, an ink supply chamber, and an ink supply port leading to the ink supply chamber and through which ink flows from the ink supply chamber to a recording head; and
a mechanism for selectively communicating said ink chamber with the recording head in response to a pressure change caused in said ink supply chamber due to ejection of ink from the recording head, said mechanism including:
a stationary valve part; and
a movable valve part having an elastically deformable membrane having a through hole;
wherein said stationary valve part and said movable valve part are normally in contact with each other to close said through hole, and said movable valve part is selectively separated from said stationary valve part to open said through hole and communicate said ink chamber with the recording head through said through hole depending on said pressure change, the elastically deformable membrane being deformed so that the through hole presses against the stationary valve part to prevent the elastically deformable membrane from separating from the stationary valve part under pressure exerted just by the ink in the ink chamber.

66. An ink tank unit according to claim 65, wherein said container has a partition wall between said ink chamber and said ink supply chamber, extending in a first direction and having a communication hole therein, and said through hole of said movable valve part is offset from said communication hole in said first direction.

67. An ink tank unit for detachable mounting on a connecting member of an ink jet recording apparatus, comprising:
a container having a partition wall that defines and separates a first ink accumulating chamber containing an ink and a second ink accumulating chamber, said partition wall extending in a first direction, and having a first communication hole;
an elastically deformable first valve part opposite from said first ink accumulating chamber with respect to said partition wall, and defining a third ink accumulating chamber between said first valve part and said partition wall and within said second ink accumulating chamber, said first valve part having a second communication hole offset from said first communication hole in said first direction;
a stationary, rigid second valve part provided to said partition wall and aligned with and blocking said second communication hole, so that when the first valve part moves said second communication hole is not blocked, the first valve part being deformed so that the second communication hole presses against the second valve part to prevent the first valve part from separating from the second valve part under pressure exerted just by the ink in the ink chamber; and
an ink supply port leading to the second ink accumulating chamber and through which ink flows from the second ink accumulating chamber to the ink-jet recording apparatus.

68. An ink tank unit according to claim 67, wherein said second valve part is protruded from said partition wall toward said first valve part.

69. An ink tank unit according to claim 68, wherein a distal end face of said second valve part contacts a part of said first valve part surrounding said second communication hole.

70. An ink tank unit for detachable mounting on a connecting member of an ink jet recording apparatus, comprising:
- a container having an ink chamber having an amount of an ink therein, an ink supply chamber, and an ink supply port leading to the ink supply chamber and through which ink flows from the ink supply chamber to a recording head; and
- a mechanism for selectively communicating said ink chamber with the recording head in response to a pressure change caused in said ink supply chamber due to ejection of ink from the recording head, said mechanism including:
  - a stationary valve part; and
  - a movable valve part having an elastically deformable membrane having a through hole;
- wherein said stationary valve part and said movable valve part are normally in contact with each other to close said through hole, the movable valve part being urged against the stationary valve part, and said movable valve part is selectively separated from said stationary valve part to open said through hole and communicate said ink chamber with the recording head through said through hole depending on said pressure change, the movable valve part separating from the stationary valve part as a result of a pressure difference between said ink chamber and said ink supply chamber due to ink consumption by the ink jet recording head.

71. An ink tank unit according to claim 70, wherein said container has a partition wall between said ink chamber and said ink supply chamber, extending in a first direction and having a communication hole therein, and said through hole of said movable valve part is offset from said communication hole in said first direction.

72. An ink tank unit for detachable mounting on a connecting member of an ink jet recording apparatus, comprising:
- a container having a partition wall that defines and separates a first ink accumulating chamber containing an ink and a second ink accumulating chamber, said partition wall extending in a first direction, and having a first communication hole;
- an elastically deformable first valve part opposite from said first ink accumulating chamber with respect to said partition wall, and defining a third ink accumulating chamber between said first valve part and said partition wall and within said second ink accumulating chamber, said first valve part having a second communication hole offset from said first communication hole in said first direction;
- a stationary, rigid second valve part provided to said partition wall and aligned with and blocking said second communication hole, the first valve part being urged against the second valve part, so that when the first valve part moves said second communication hole is not blocked, the first valve part separating from the second valve part as a result of a pressure difference between said first ink accumulating chamber and said second ink accumulating chamber due to ink consumption by the ink jet recording headA; and
- an ink supply port leading to the second ink accumulating chamber and through which ink flows from the second ink accumulating chamber to the ink-jet recording apparatus.

73. An ink tank unit according to claim 72, wherein said second valve part is protruded from said partition wall toward said first valve part.

74. An ink tank unit according to claim 73, wherein a distal end face of said second valve part contacts a part of said first valve part surrounding said second communication hole.

* * * * *